United States Patent
Carbajal et al.

(10) Patent No.: US 6,560,706 B1
(45) Date of Patent: May 6, 2003

(54) INTERFACE FOR ENSURING SYSTEM BOOT IMAGE INTEGRITY AND AUTHENTICITY

(75) Inventors: John M. Carbajal, Barcelona (ES); Eric R. Dittert, Portland, OR (US); Paul C. Drews, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/234,757

(22) Filed: Jan. 21, 1999

Related U.S. Application Data (60) Provisional application No. 60/072,500, filed on Jan. 26, 1998.

(51) Int. Cl.[7] .................................. H04L 9/00; G06F 11/30
(52) U.S. Cl. ................................ 713/155; 713/200
(58) Field of Search ........................ 713/1–2, 155–157, 713/187–201; 380/255

(56) References Cited

U.S. PATENT DOCUMENTS

| | | | |
|---|---|---|---|
| 4,405,829 A | | 9/1983 | Rivest et al. |
| 5,050,212 A | * | 9/1991 | Dyson ........................ 713/187 |
| 5,287,519 A | | 2/1994 | Dayan et al. |
| 5,421,006 A | * | 5/1995 | Jablon et al. ................. 714/36 |
| 5,454,000 A | * | 9/1995 | Dorfman ..................... 714/54 |

(List continued on next page.)

OTHER PUBLICATIONS

Arbaugh et al, "Automated Recovery in a Secure Bootstrap Process", p. 1–13.*

(List continued on next page.)

Primary Examiner—Matthew Smithers
(74) Attorney, Agent, or Firm—Blakely, Sokoloff, Taylor & Zafman LLP (57) ABSTRACT

A method and apparatus for ensuring system boot image integrity and authenticity is described. In one embodiment, the invention provides security from the end of Basic Input/Output System (BIOS) initialization to the point in time at which control is transferred to a high-level operating system (OS). The OS boot image is obtained via a network connection and is checked for integrity and authority to run on a particular platform. For this purpose, the invention provides a boot image security usage model that is simple and flexible enough to cover a variety of needs. Because receipt of boot images via a network connection can be subject to size constraints, the invention allows software to bootstrap more sophisticated security software if desired. In general, the invention utilizes one or more Remote-Boot Authorization Certificates for each group of platforms to be managed. The authorization certificate for a group of platforms is configured into each of the platforms in a group as the source of authority for allowing boot images to be executed. The authorization certificate is also the source of authority for allowing reconfiguration commands, including reconfiguration commands that transfer the source of authority to another authority. In one embodiment, IT organizations can create different authorization certificates for different groups to allow the different groups to be managed by different authorities. Authority can also be transferred between management groups. The Remote-Boot Authorization Certificates provide protection against remote-boot images that have been damaged and/or tampered with either in transit or on a server, the ability to designate and enforce which boot images are permitted, and a mechanism to limit the scope of management authorities having remote-boot authority.

34 Claims, 4 Drawing Sheets

U.S. PATENT DOCUMENTS

| | | | |
|---|---|---|---|
| 5,568,552 A | | 10/1996 | Davis |
| 5,680,547 A | | 10/1997 | Chang |
| 5,713,009 A | | 1/1998 | DeRosa, Jr. et al. |
| 5,822,565 A | | 10/1998 | DeRosa, Jr. et al. |
| 5,844,986 A | * | 12/1998 | Davis .................. 713/187 |
| 5,848,231 A | | 12/1998 | Teitelbaum et al. |
| 5,881,287 A | | 3/1999 | Mast |
| 5,919,257 A | * | 7/1999 | Trostle .................. 713/200 |
| 5,999,711 A | * | 12/1999 | Misra et al. .............. 709/310 |
| 6,009,524 A | | 12/1999 | Olarig et al. |
| 6,034,832 A | | 3/2000 | Ichimura et al. |
| 6,061,794 A | | 5/2000 | Angelo et al. |
| 6,067,640 A | | 5/2000 | Akiyama et al. |
| 6,185,678 B1 | * | 2/2001 | Arbaugh et al. ............ 713/2 |
| 6,189,100 B1 | * | 2/2001 | Barr et al. ................ 380/255 |

OTHER PUBLICATIONS

Dynamic Host Configuration Protocol, Droms, R. Network Working Group, Request for Comments: 1541, Obsoletes: 1531, Category: Standards Track, Oct. 1993, 48 total pages (through [p. 39]).

* cited by examiner

INTERFACE FOR ENSURING SYSTEM BOOT IMAGE INTEGRITY AND AUTHENTICITY

This U.S. patent application claims the benefit of U.S. Provisional Application No. 60/072,500, filed Jan. 26, 1998.

RELATED APPLICATIONS

This U.S. patent application is related to U.S. patent application Ser. No. 09/166,275 filed Oct. 5,1998 and entitled "A SYSTEM AND METHOD FOR VERIFYING THE INTEGRITY AND AUTHORIZATION OF SOFTWARE BEFORE EXECUTION IN A LOCAL PLATFORM" and U.S. patent application Ser. No. 09/224,003 filed Dec. 31, 1998 and entitled "SECURE TRANSFER OF TRUST IN A COMPUTER SYSTEM."

FIELD OF THE INVENTION

The invention relates to the field of data security. More particularly, the invention relates to a scheme for verifying the integrity and authority of downloaded code used for boot and pre-boot operations of a system.

BACKGROUND OF THE INVENTION

In order to improve the effectiveness of networked computer systems or other electronic devices, organizations that have many networked devices typically have Information Technology (IT) departments staffed by computer technicians responsible for servicing the computer systems or other electronic devices that belong to the organization. To improve the effectiveness of the IT department, many organizations have a centralized platform that allows the technicians to access other devices on the network to perform maintenance operations. This reduces time wasted by the technicians traveling between jobs or facilities.

One important function included in remote maintenance operations includes the transfer of executable code, including boot code, to a device coupled to the network. Transfer of boot code over a network can also be part of a normal boot operation for networked devices. However, because boot code is the foundation for operation of a computer system or other electronic device, boot code security is an important factor in providing effective operation of an electronic device that receives boot code via a network connection.

Unfortunately, there currently exists no security scheme to ensure integrity of a boot image (e.g., check that the software is free from viruses or has not been tampered with before or during download) as well as authenticity (e.g., check that the boot image originated from an authorized source). Therefore, what is needed is a method and apparatus for ensuring system boot integrity and authorization.

SUMMARY OF THE INVENTION

A method and apparatus for ensuring system boot image integrity and authenticity is described. A first segment of a boot image is received from a remote device. The integrity of the segment is verified. Proper authorization of the segment is determined, at least in part, by a Remote-Boot Authorization Certificate that indicates an authorized source for the first segment of the boot image. If the segment passes the verification and authorization checks, a sequence of instructions represented by the first segment of the boot image is executed.

In one embodiment, a boot image sufficient to boot a networked device is received in several segments. Each segment is subjected to integrity and authorization verification. In one embodiment, the Remote-Boot Authorization Certificate and other parameters used for integrity and authorization verification can be modified by the remote device. The verification mechanism is integrated with a mechanism to configure the Remote-Boot Authorization Certificate.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for ensuring system boot image integrity and authenticity is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention described herein provides basic security needs during part of the boot phase of system startup. In one embodiment, the invention provides security from the end of Basic Input/Output System (BIOS) initialization to the point in time at which control is transferred to a high-level operating system (OS). The OS boot image is obtained via a network connection and is checked for integrity and authority to run on a particular platform. For this purpose, the invention provides a boot image security usage model that is simple and flexible enough to cover a variety of needs. Because receipt of boot images via a network connection can be subject to size constraints, the invention allows software to bootstrap more sophisticated security software if desired.

In general, the invention utilizes one or more Remote-Boot Authorization Certificates for each group of platforms to be managed. The authorization certificate for a group of platforms is configured into each of the platforms in a group as the source of authority for allowing boot images to be executed. In one embodiment, IT organizations can create different authorization certificates for different groups to allow the different groups to be managed by different authorities. Authority can also be transferred between management groups. The Remote-Boot Authorization Certificates provide protection against remote-boot images that have been damaged and/or tampered with either in transit or on a server, the ability to designate and enforce which boot images are permitted, and a mechanism to limit the scope of management authorities having remote-boot authority.

Figure 1:
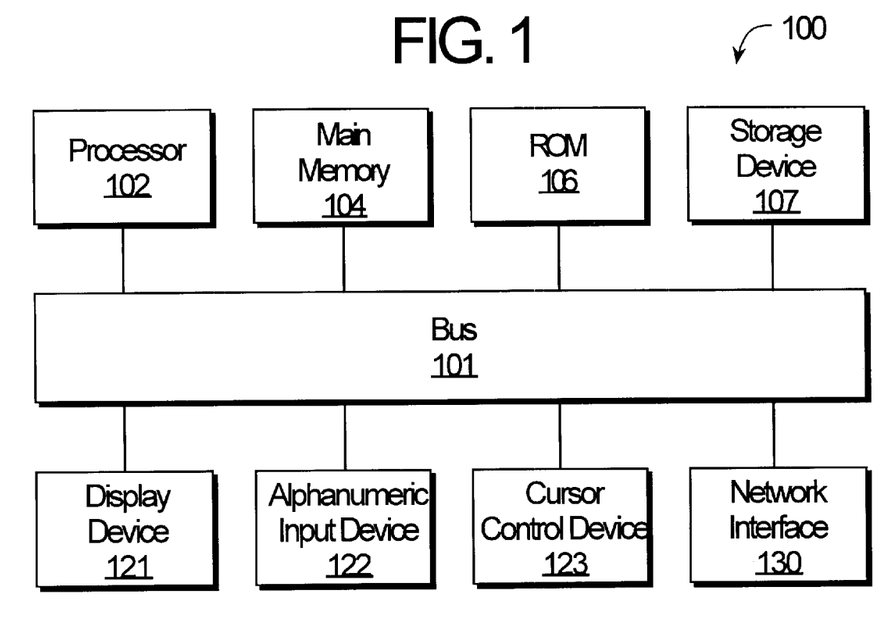
FIG. 1 is one embodiment of a computer system suitable for use with the invention.

FIG. 1 is one embodiment of a computer system suitable for use with the invention. Computer system 100 includes bus 101 or other communication device for communicating information and processor 102 coupled to bus 101 for processing information. While computer system 100 is illustrated with a single processor, computer system 100 can include multiple processors. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as flash memory, a magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Computer system 100 further includes network interface 130 that provides access to a network (not shown in FIG. 1). In one embodiment, network interface 130 is a network interface card (NIC); however, other network interfaces can also be used. Network interface 130 is used to download boot images from a remote server to boot computer system 100 according to the invention or reconfiguration commands from a management device to reconfigure computer system 100 according to the invention. The downloaded boot image can be stored, for example, in main memory 104, ROM 106, or other memory device.

One embodiment of the invention is related to the use of computer system 100 to provide system boot image integrity and authenticity. According to one embodiment, system boot image integrity and authenticity is determined by computer system 100 in response to processor 102 executing sequences of instructions contained in main memory 104.

Instructions are provided to main memory 104 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the invention. Thus, the invention is not limited to any specific combination of hardware circuitry and software instructions.

Figure 2:
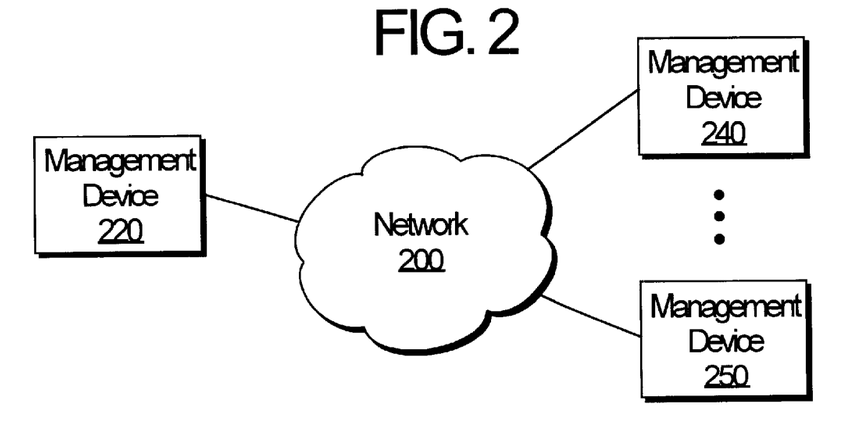
FIG. 2 is a network configuration of devices suitable for use with the invention.

FIG. 2 is a network configuration of devices suitable for use with the invention. For reasons of simplicity, only a single management device and two managed devices are illustrated in FIG. 2; however, any number of management devices and any number of managed devices can be used with the invention.

Network 200 provides an interconnection between multiple electronic devices, such as computer systems, printers, facsimile machines, etc. In one embodiment, network 200 is a local area network (LAN) such as those well known in the art. In alternative embodiments, network 200 can be a wide area network (WAN), the Internet, or any other type of network.

Management device 220 is a server or other device that stores one or more boot images that can be used to boot managed devices. Management device 220 can be, for example, a server controlled by an IT organization such that technicians can download a boot image from management device 220 to a managed device via network 200. The integrity and authority of the downloaded boot image is checked by the managed device as described in greater detail below.

Managed devices 240 and 250 are coupled to management device 220 via network 200. Managed devices 240 and 250 can receive boot images and other executable code from management device 220 or another server. Boot images, for example, can be received for maintenance purposes (e.g., boot a device that will not boot otherwise) or during the course of normal startup. Managed devices 240 and 250 can receive boot images from the same server or from different servers. Similarly, managed devices 240 and 250 can receive the same or different boot images.

An IT organization, for example, managing a group of platforms (e.g., managed devices 240 and 250) configures each of the platforms to recognize the IT organization's Remote-Boot Authorization Certificate as the source of authority for signing Remote-Boot objects. The IT organization uses the Remote-Boot Authorization Certificate to create a signed manifest (described in greater detail below) authorizing a particular object to be used as a Remote-Boot object on a particular set of managed platforms. In one embodiment, the IT organization uses a private cryptographic key corresponding to the IT organization's public cryptographic key to sign the manifest.

The IT organization can delegate authority to a sub-group or to another group by modifying the Remote-Boot Authorization Certificate in each platform for which the new group is authorized to supply boot images. Delegation of Remote-Boot Authority is described in greater detail below. When a managed platform downloads a Remote-Boot object, the platform also downloads a corresponding signed manifest. The managed platform checks the authority of the downloaded Remote-Boot object against the signed manifest to determine integrity. The platform also checks the authority of the manifest to determine whether the manifest was signed with the private key corresponding to the public key in the managed platform's Remote-Boot Authorization Certificate. If so, the Remote-Boot object is authorized for use by the managed platform.

In another embodiment, managed devices 240 and 250 can receive reconfiguration commands from management device 220 or another server. An IT organization, for example, managing a group of platforms (e.g., managed devices 240 and 250) can download reconfiguration commands to the managed platforms to alter their configuration. The IT organization uses the Remote-Boot Authorization Certificate to create a signed manifest (described in greater detail below) requesting that a particular managed platform's configuration be altered in a particular way. In one embodiment, the IT organization uses a private cryptographic key corresponding to the IT organization's public cryptographic key to sign the manifest, to assure that the reconfiguration command comes from the designated source of authority.

Figure 3:
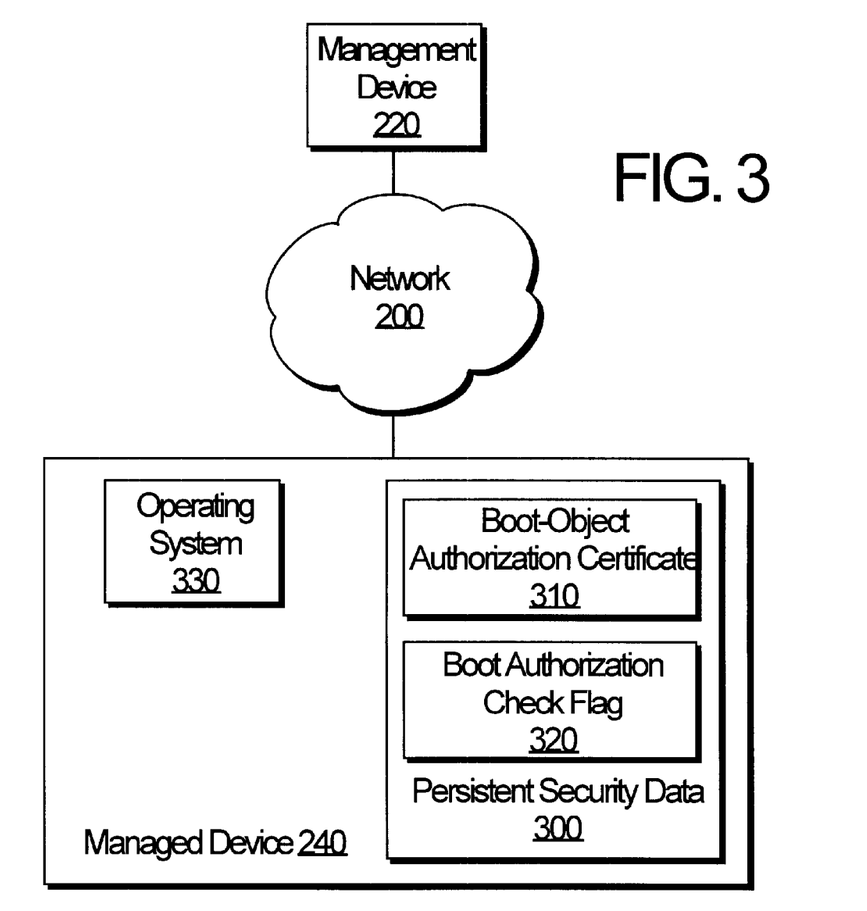
FIG. 3 is a network-connected managed device providing boot integrity services according to one embodiment of the invention.

FIG. 3 is a network-connected managed device providing boot integrity services according to one embodiment of the invention. In one embodiment, the invention is supported by two configurable parameters for each managed platform. The values of the parameters are persistent and protected across system reboots and power interruptions.

Managed device 240 includes persistent security data store 300. In one embodiment, persistent security data store 300 is flash memory that maintains Boot Object Authorization Certificate 310 and Boot Authorization Check Flag 320 in a persistent manner. The contents of persistent security data store 300 is modifiable only through the interface of the invention described herein. Other types of memory can also be used for persistent security data store 300. Operating system 330 is downloaded by managed device 240 from management device 220 as a result of a successful boot sequence.

Boot Object Authorization Certificate 310 identifies the source of a boot object that is recognized as authorized to supply boot objects. In one embodiment, Boot object Authorization Certificate 310 includes a public cryptographic key corresponding to a private cryptographic key belonging to the authorized source of a boot object. In alternative embodiments, other mechanisms for determining the source of a boot object can be used. Boot Authorization Check Flag 320 indicates whether authorization of boot images are required.

One embodiment of the invention is supported by three functions described in greater detail below. The function BIS_VerifyBootObject allows managed device 240 to determine the integrity and authorization of a boot image received from management device 220 via network 200. The two functions, BIS_UpdateBootObjectAuthorization and BIS_GetBootObjectAuthorizationUpdateToken, allow managed device 240 to determine the integrity and authorization of a reconfiguration command received from management device 220 via network 200.

Figure 4:
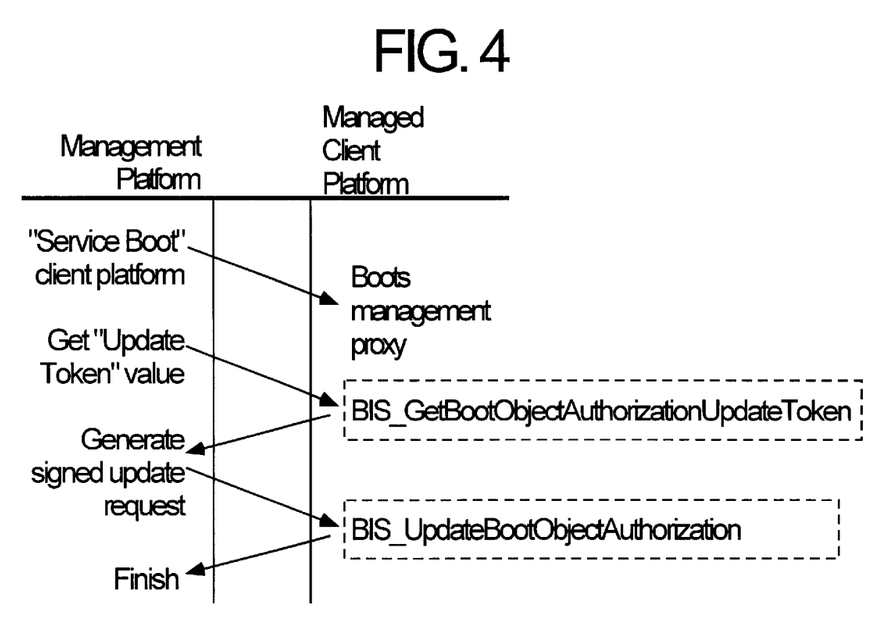
FIG. 4 is configuration update interaction between a management platform and a managed client platform according to one embodiment of the invention.

FIG. 4 is configuration update interaction between a management platform and a managed client platform according to one embodiment of the invention. In terms of the description of FIGS. 2 and 3, the management platform of FIG. 4 corresponds to management device 220 and the managed client platform corresponds to managed devices 240 and 250.

The management platform causes the managed client to boot a small proxy application that performs operations on the managed client on behalf of the management platform. The managed client platform requests an update token value that is returned by the BIS_GetBootObjectAuthorization UpdateToken function. In response, the management platform generates an update request credential message describing the configuration changes and including the update token.

The management platform signs the request credential using the private key corresponding to the managed client's Boot Object Authorization Certificate and sends the request credential to the managed client platform. The managed client platform verifies the signature and performs the update using the BIS_UpdateBootObjectAuthorization function and returns a confirmation. The management platform checks the confirmation.

In one embodiment, the invention uses a unique update token that is associated with the Boot Object Authorization parameters described above. The token value is a computed value unique to the parameter set and the platform. A new token value is generated when a parameter is modified, which provides uniqueness in time. Use of the token value protects the managed device against certain types of attacks.

The unique update token changes to a new unique value whenever a configuration parameter is changed. In addition, the unique token is unique to the specific platform it came from and the parameter set. These uniqueness properties can be used when the configuration update process is performed with a managed client that is not running a high-level OS. In such an environment, the managed client platform is unlikely to support private authenticated communications.

In one embodiment the update request credential includes a digital signature used to determine the authority of the update request. In one embodiment, the digital signature can be either a Digital Signature Algorithm (DSA) signature as proposed by the National Institute of Standards, which implies the SHA-1 hash algorithm and a 1024-bit key length, or a Rivest Shamir Adleman (RSA) algorithm as described by RSA Data Security, Inc. of Redwood City Calif., which implies the MD5 hash algorithm and a 512-bit key length. Other signature algorithms, hash algorithms and/or key lengths can also be used. Both of these functions are described in pages 466–494 of a publication entitled "Applied Cryptography: Protocols, Algorithms and Source Code in C" by Bruce Schneier, published by John Wiley & Sons, Inc. (1996).

If the digital signature of the received updated request credential verifies using the Boot Object Authorization Certificate for the managed client platform, the update request is accepted. Otherwise, the update request is not accepted. The unique update token and the signed request credential combine to guard against attacks based on capturing and replaying an identical or altered update request to the same or different managed client platforms.

The configuration model described above takes advantage of the Remote-Boot Authorization Certificate. The key used to sign a configuration update request credential is the private key corresponding to the public key in the managed client platform's configured Boot Object Authorization Certificate. Thus, the authority to re-configure a managed platform is restricted to the holder of that private key. In other words, an IT organization (or sub-organization) that "owns" the management authority for that managed client platform alone has the authority to re-configure platform parameters.

In one embodiment, the Remote Boot Object Authorization Certificate in a platform that is used to validate update request authority is also a configurable parameter. This has the effect that a managing authority can transfer managing authority to another organization. While the discussion with respect to FIG. 4 describes re-configuration of parameters, it assumes a pre-existing parameter set. The following discussion describes two approaches to first-time setup of a managed client platform. The managed client device can be configured for either "continuous security" or for "unattended setup."

To provide a continuous security configuration, a manufacturer or other supplier of the managed client device configures the platform such that the Boot Authorization Check Flag is set and no Boot Object Authorization Certificate is stored. With this configuration, authorization of a boot object is performed, however, no Boot Object Authorization Certificate is stored to determine authority. Because no Boot Object Authorization Certificate exists, a "fall back" function is used to perform authorization checks. In one embodiment, a user interaction is required to confirm a digital signature or hash value. Other fall back functions can also be used.

If authorization is granted by the fall back function, the boot procedure can be performed and the parameter set can be modified to provide a Boot Object Authorization Certificate. For subsequent boot operations the Boot Object Authorization Certificate is used to determine the authority of boot code downloaded. Thus, after the first boot requiring use of the fall back function, subsequent boot operations occur without user interaction.

An unattended first-time setup can be performed where less security is desired. For an unattended first-time setup the manufacturer or other supplier of the managed client platform configures the platform with the Boot Authorization Check Flag set and a special "first-time setup" Boot Object Authorization Certificate configured. The special Boot Object Authorization Certificate can be, for example, the same for all platforms. The manufacturer or supplier also supplies the private cryptographic key corresponding to the Boot Object Authorization Certificate to the IT organization responsible for the platform.

The IT organization then signs the first boot operation with the private cryptographic key provided by the manufacturer. The IT organization can then reconfigure the managed client platform with a Boot Object Authorization Certificate having a public cryptographic key corresponding to a private cryptographic key owned by the IT organization. Because the fall back function that may require user interaction is not used, the first-time setup can be performed unattended.

Figure 5:
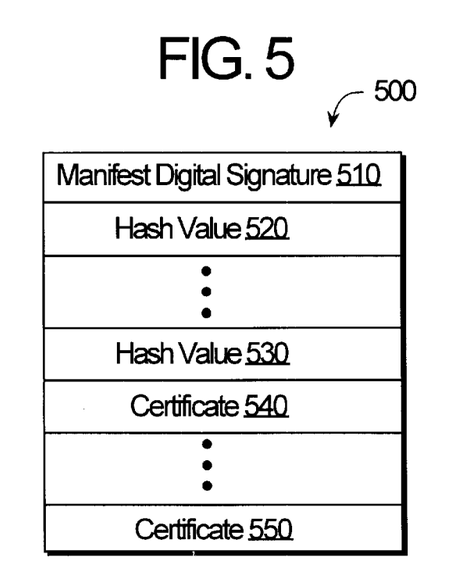
FIG. 5 is a digital manifest to store hash values and digital certificates according to one embodiment of the invention.

FIG. 5 is a digital manifest to store hash values and digital certificates according to one embodiment of the invention. In one embodiment the digital manifest is defined by the "Signed Manifest Specification" published by The Open Group in 1997. Other types of signed manifests, or similar structures can also be used. In one embodiment the digital certificates are X.509v3 digital certificates as defined by [CITE TO X.509V.3 SPEC] Other types of digital certificates can also be used.

Signed manifest 500 includes manifest digital signature 510, a secure hash value (e.g., hash value 520, hash value 530) for each sub-image of a boot image, and a certificate chain (e.g., certificate 540, certificate 550). The certificate chain provides the identity of the signatory of signed manifest 500 and entities that have bestowed signing authority to the signatory. Each secure hash value is produced by loading a corresponding sub-image into a one-way hash function that converts the portions of the boot image into information of a fixed length ("hash value"). The term "one-way" indicates that there does not readily exist an inverse function to recover any discernible portion of the boot image from the hash value.

In one embodiment, manifest digital signature 510 is produced by appending M hash values (e.g., 520, 530) end-to-end to provide a hash set, where M $\geq$ 1 and M is a whole number. The hash set is digitally signed with a private cryptographic key of the source authorized to provide the boot image. In one embodiment the function used for digitally signing information includes RSA digital signature algorithm and/or the DSA digital signature algorithm.

For a certificate chain having a set of R digital certificates, where R $\geq$ 1, and R is a whole number, a first digital certificate (e.g., certificate 540) includes a subject public key of the signatory, namely the source responsible for digitally signing signed manifest 500. Thereafter, the remaining R−1 digital certificates collectively provide a sequence of those sources issuing the first digital certificate used to sign signed manifest 500. For example, a second digital certificate includes the subject public key of a second source that signed the first digital certificate using the corresponding private key of that second source.

Use of the certificate chain provides the ability to delegate signing authority from one source to another. The signatory of signed manifest 500 is accepted as an authorized signatory when one of the certificates in the certificate chain includes a subject public key matching the subject public key in the authorization certificate. Also, for each certificate in the certificate chain, the certificate verifies with the subject public key of the subsequent certificate in the certificate chain. An authorized source delegates authorization to a signatory by providing an unbroken sequence of certificates between the authorized source and the signatory.

Figure 6:
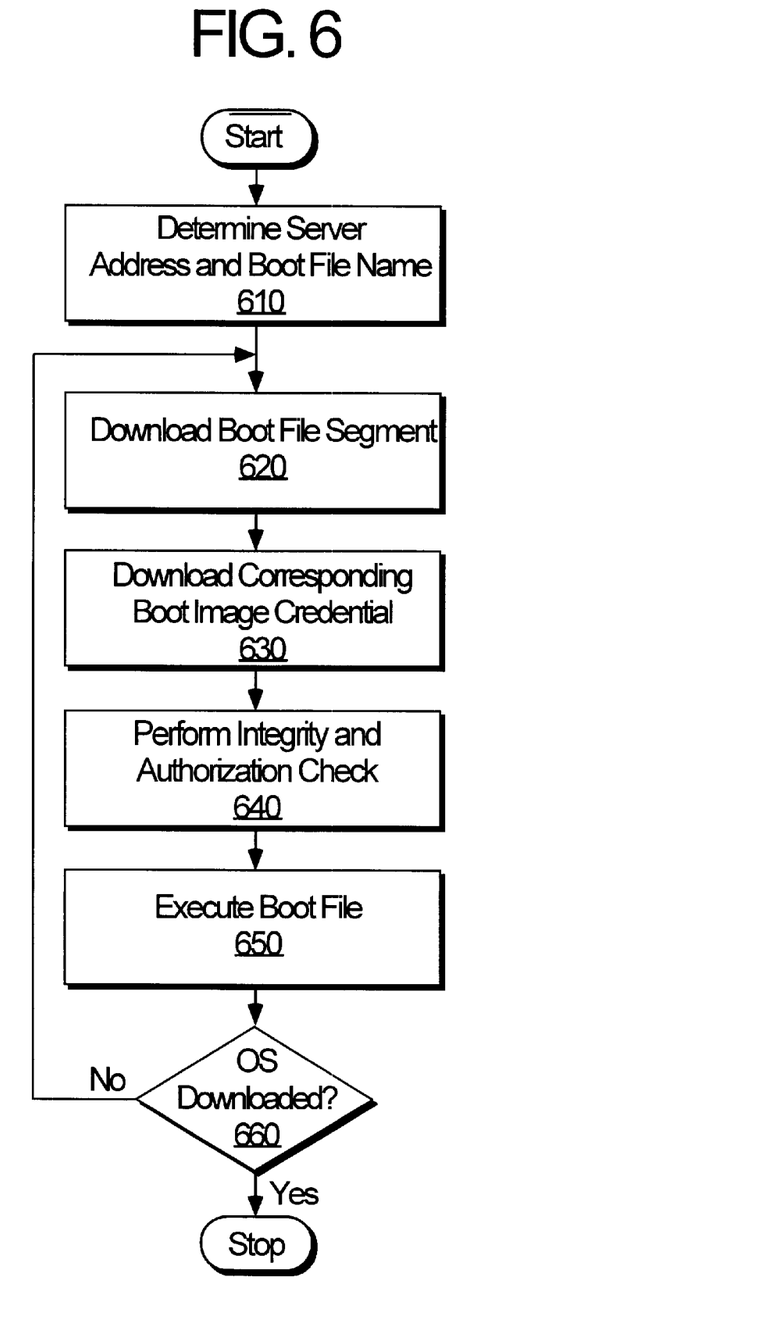
FIG. 6 is a flow diagram of a remote boot authorization according to one embodiment of the invention.

FIG. 6 is a flow diagram of a remote boot authorization according to one embodiment of the invention. Before a remote boot operation is performed the IT organization or other organization that manages the platform configures the Boot Object Authorization Certificate for the platform as described above. The IT organization can, for example, generate several boot image credential files for the boot image, one for each of the signature algorithm and key length combinations supported. In one embodiment, the boot image credential is a signed manifest, such as the signed manifest described above that includes integrity data for the boot image, the signing organization's certificate, and a digital signature for the entire manifest.

The managing organization stores the boot image file and the corresponding boot image credential files at a location known to the managed platforms. The managed platform determines the server address and boot image file name and location at 610. In one embodiment remote boot code stored on a network interface card uses Dynamic Host Configuration Protocol (DHCP) to obtain a platform Internet Protocol (IP) address, a boot server IP address, and a boot image file name. DHCP is described in Internet Engineering Task Force (IETF) request for comments (RFC) 1541. Other protocols can also be used to obtain the relevant addresses and file locations.

A segment of the boot image file is downloaded at 620. Code for a boot operation can be downloaded in segments in order to better utilize network bandwidth and system storage capabilities. Stages of boot code are downloaded until the managed platform has downloaded sufficient code to be self-sufficient. For each boot segment downloaded a corresponding boot image credential is downloaded at 630. As described above, the boot image credential is a signed manifest, one embodiment of which is described with respect to FIG. 5.

Integrity and authority checks are performed at 640 using the function BIS_VerifyBootObject. In one embodiment, integrity of the boot object is checked using a hash value from the signed manifest. Use of hash functions is well known in the art. Integrity of the signed manifest is checked using the digital signature 510 of the signed manifest 500. Other types of integrity verification can also be performed. In one embodiment, the authority of the boot object is checked using a certificate included in the signed manifest. The public key in the certificate is compared to the public key in the Boot Object Authorization Certificate stored by the platform. If the keys match, the signature was generated by the accepted authority and the authorization check passes. Otherwise, the boot attempt fails.

If the integrity and authority check passes at 640, the boot file is executed at 650. In one embodiment, the first stage downloaded is a first-stage bootstrap that contains a basic memory manager to make additional memory space available. The additional memory space is used to download a second-stage bootstrap using a server, protocol and file location determined from the first-stage bootstrap. Several stages can be used. The process of 620 through 650 is repeated until sufficient OS capabilities are downloaded at 660.

In an extended bootstrap sequence containing multiple stages, subsequent stages after the first may need to perform integrity checks for downloaded data objects consisting of multiple segments. Furthermore, subsequent stages can perform authority checks using a different source other than the Boot Object Authorization Certificate stored by the platform. For example, a likely source of authority for subsequent bootstrap stages would be a certificate representing the vendor of the subsequent bootstrap software stages themselves. The function BIS_VerifyObjectWithCredential is similar to BIS_VerifyBootObject, except that it allows the caller to determine which of several sections in a signed manifest shall be used as the integrity check for the data object, and what certificate shall be used as the source of authority for the authority check.

In one embodiment remote boot operations have a "lifetime" defined by function calls (e.g., BIS_Initalize and BIS_Shutdown) during which remote boot operations can be performed. The function names BIS_Initialize and BIS_Shutdown are used for description and are not necessary to practice the invention. The invention can also be practiced without a boot operation lifetime. Thus, in order to perform a successful boot operation, the first function that is called is BIS_Initialize.

The BIS_Initialize function returns a handle representing an instance of initialization of a boot integrity and authorization sequence. Other integrity and authorization checking functions use the handle as a parameter, so that these functions can only be called when the handle is valid (e.g., during a bounded boot operation sequence). The BIS_Shutdown function invalidates the handle to terminate the corresponding boot sequence. Multiple handles can be valid simultaneously.

One embodiment of the interface of the invention includes the functions described below. Some of the functions have been described in greater detail above. Different functions as well as different function names can be used to implement the invention.

The BIS_GetBootObjectAuthorizationCertificate function retrieves the currently configured Remote Boot Object Authorization Certificate. The caller supplies functions to interpret the contents of the certificate, if desired.

The BIS_VerifyBootObject function verifies the integrity and authorization of a data object according to supplied credentials and the platform's configured Remote Boot Object Authorization Certificate. If a boot authorization check is not required on the platform, no authorization check is performed. If credentials are not supplied, no integrity check is performed and the function returns an indication of "success." In one embodiment, if credentials are supplied, one or more of the following integrity checks are performed: (1) the credential is a signed manifest with a single signer and the signer's identity is included in the manifest as a certificate and (2) the manifest includes a hash value or other verification information that matches the hash value of other verification information computed based on the received boot object.

If a boot authorization is required on the platform an integrity check, such as the integrity check described above, is required and one of the following authorization checks is performed: (1) if a Remote Boot Object Authorization Certificate is not currently configured user interaction or other "fall back" authorization is required (e.g., the function can interact with a user in a platform-specific manner to determine whether the operation should succeed; (2) if the Remote Boot Object Authorization Certificate is currently configured the public key certified by the signer's certificate must match the public key in the Remote Boot Object Authorization Certificate to determine whether the operation should succeed.

The BIS_GetBootObjectAuthorizationCheckFlag function retrieves the currently configured setting of the Boot Authorization Check Flag.

The BIS_GetBootObjectAuthorizationUpdateToken function retrieves a unique token value to be included in the request credential for the next update of any parameter in the Boot Object Authorization set (e.g., Boot Object Authorization Certificate, Boot Authorization Check Flag).

The BIS_UpdateBootObjectAuthorization function updates one of the configurable parameters of the Boot Object Authorization set.

The BIS_VerifyObjectWithCredential function performs both an integrity check and an authorization check. The credential is a signed manifest with a single signer and the identity of the signer is included in the manifest as a certificate. The manifest further includes a hash value or other verification information that is used to verify the integrity of the remote boot object. The authorization check is optional and compares a public key in the manifest to the public key stored in the Remote-Boot Authorization Certificate.

The BIS_Initialize function is the first BIS function called by an application. The function returns a handle value that is used by all subsequent BIS functions. Multiple handles can be active simultaneously.

The BIS_Shutdown function destroys a handle created by the BIS_Initialize function. After a handle is destroyed BIS functions can no longer be called with the handle.

The BIS_GetSignatureInfo function retrieves a list of digital signature algorithms, hash algorithms, and key length combinations supported by a particular platform.

The BIS_Free function explicitly returns memory resources that were reserved temporarily by the other functions.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of performing remote boot operations, the method comprising:

receiving a first segment of a boot image from a remote device;

verifying integrity of the first segment of the boot image;

determining authorization of the first segment of the boot image, wherein authorization is determined, at least in part, by a Remote-Boot Authorization Certificate that indicates an authorized source for the first segment of the boot image; and executing a sequence of instructions represented by the first segment of the boot image.

2. The method of claim 1 further comprising receiving a signed manifest associated with the first segment of the boot image, the signed manifest having a digital certificate and a hash value corresponding to the first segment of the boot image.

3. The method of claim 2 wherein verifying integrity of the first segment of the boot image further comprises:

performing a hash function on the first segment of the boot image; and comparing a result of the hash function to the hash value from the signed manifest.

4. The method of claim 1 wherein receiving a first segment of a boot image from a remote device further comprises:

determining an address of the remote device;

determining a file name for the first segment of the boot image; and downloading the first segment of the boot image from the named file in the remote device.

5. A method of performing remote boot operations, the method comprising:

receiving a first segment of a boot image from a remote device;

verifying integrity of the first segment of the boot image;

determining authorization of the first segment of the boot image, wherein authorization is determined, at least in part, by a Remote-Boot Authorization Certificate that indicates an authorized source for the first segment of the boot image and further wherein the Remote-Boot Authorization Certificate is configurable by the remote device by receiving a reconfiguration operation from the remote device, checking the integrity of the reconfiguration operation, determining whether the reconfiguration operation is authorized to be performed, and modifying a parameter set based; at least in part, on the reconfiguration operation; and executing a sequence of instructions represented by the first segment of the boot image.

6. The method of claim 5 further comprising receiving a signed manifest associated with the first segment of the boot image, the signed manifest having a digital certificate and a hash value corresponding to the first segment of the boot image.

7. The method of claim 6 wherein verifying integrity of the first segment of the boot image further comprises:

performing a hash function on the first segment of the boot image; and comparing a result of the hash function to the hash value from the signed manifest.

8. The method of claim 5 wherein receiving a first segment of a boot image from a remote device further comprises:

determining an address of the remote device;

determining a file name for the first segment of the boot image; and downloading the first segment of the boot image from the named file in the remote device.

9. A method of performing remote boot operations, the method comprising:

receiving a first segment of a boot image from a remote device;

verifying integrity of the first segment of the boot image;

determining authorization of the first segment of the boot image, wherein authorization is determined, at least in part, by a Remote-Boot Authorization Certificate that indicates an authorized source for the first segment of the boot image; and executing a sequence of instructions represented by the first segment of the boot image by receiving a second segment of the boot image from the remote device, verifying integrity of the second segment of the boot image, determining authorization of second segment of the boot image, wherein authorization is determined, at least in part, by a Remote-Boot Authorization Certificate that indicates an authorized source for the second segment of the boot image, and executing a sequence of instructions represented by the second segment of the boot image.

10. The method of claim 6 further comprising receiving a signed manifest associated with the first segment of the boot image, the signed manifest having a digital certificate and a hash value corresponding to the first segment of the boot image.

11. The method of claim 10 wherein verifying integrity of the first segment of the boot image further comprises:

performing a hash function on the first segment of the boot image; and comparing a result of the hash function to the hash value from the signed manifest.

12. The method of claim 9 wherein receiving a first segment of a boot image from a remote device further comprises:

determining an address of the remote device;

determining a file name for the first segment of the boot image; and downloading the first segment of the boot image from the named file in the remote device.

13. An article comprising a machine-readable medium having stored thereon sequences of instructions that when executed cause one or more processors to:

receive a first segment of a boot image from a remote device;

verify integrity of the first segment of the boot image;

determine authorization of the first segment of the boot image, wherein authorization is determined, at least in part, by a Remote-Boot Authorization Certificate that indicates an authorized source for the first segment of the boot image; and execute a sequence of instructions represented by the first segment of the boot image.

14. The article of claim 13 further comprising sequences of instructions that when executed cause the one or more processors to receive a signed manifest associated with the first segment of the boot image, the signed manifest having a digital certificate and a hash value corresponding to the first segment of the boot image.

15. The article of claim 14 wherein the sequences of instructions that cause the one or more processors to verify integrity of the first segment of the boot image further comprise sequences of instructions that cause the one or more processors to:

perform a hash function on the first segment of the boot image; and compare a result of the hash function to the hash value from the signed manifest.

16. The article of claim 13 wherein the sequences of instructions that cause the one or more processors to receive a first segment of a boot image from a remote device further comprise sequences of instructions that cause the one or more processors to:

determine an address of the remote device;

determine a file name for the first segment of the boot image; and download the first segment of the boot image from the named file in the remote device.

17. An article comprising a machine-readable medium having stored thereon sequences of instructions that when executed cause one or more processors to:

receive a first segment of a boot image from a remote device;

verify integrity of the first segment of the boot image;

determine authorization of the first segment of the boot image, wherein authorization is determined, at least in part, by Remote-Boot Authorization Certificate that indicates an authorized source for the first segment of the boot image; and execute a sequence of instructions represented by the first segment of the boot image wherein the Remote-Boot Authorization Certificate is configurable by the remote device by receiving a reconfiguration operation from the remote device, checking the integrity of the reconfiguration operation, determining whether the reconfiguration operation is authorized to be performed, and modifying a parameter set based, at least in part, on the reconfiguration operation.

18. The article of claim 17 further comprising sequences of instructions that when executed cause the one or more processors to receive a signed manifest associated with the first segment of the boot image, the signed manifest having a digital certificate and a hash value corresponding to the first segment of the boot image.

19. The article of claim 17 wherein the sequences of instructions that cause the one or more processors to verify integrity of the first segment of the boot image further comprise sequences of instructions that cause the one or more processors to:

perform a hash function on the first segment of the boot image; and compare a result of the hash function to the hash value from the signed manifest.

20. The article of claim 17 wherein the sequences of instructions that cause the one or more processors to receive a first segment of a boot image from a remote device further comprise sequences of instructions that cause the one or more processors to:

determine an address of the remote device;

determine a file name for the first segment of the boot image; and download the first segment of the boot image from the named file in the remote device.

21. An article comprising a machine-readable medium having stored thereon sequences of instructions that when executed cause one or more processors to:

receive a first segment of a boot image from a remote device;

verify integrity of the first segment of the boot image;

determine authorization of the first segment of the boot image, wherein authorization is determined, at least in part, by a Remote-Boot Authorization Certificate that indicates an authorized source for the first segment of the boot image; and execute a sequence of instructions represented by the first segment of the boot image by receiving a second segment of the boot image from the remote device, verifying integrity of the second segment of the boot image, determining authorization of second segment of the boot image, wherein authorization is determined, at least in part, by a Remote-Boot Authorization Certificate that indicates an authorized source for the second segment of the boot image, and executing a sequence of instructions represented by the second segment of the boot image.

22. The article of claim 21 further comprising sequences of instructions that when executed cause the one or more processors to receive a signed manifest associated with the first segment of the boot image, the signed manifest having a digital certificate and a hash value corresponding to the first segment of the boot image.

23. The article of claim 21 wherein the sequences of instructions that cause the one or more processors to verify integrity of the first segment of the boot image further comprise sequences of instructions that cause the one or more processors to:

perform a hash function on the first segment of the boot image; and compare a result of the hash function to the hash value from the signed manifest.

24. The article of claim 21 wherein the sequences of instructions that cause the one or more processors to receive a first segment of a boot image from a remote device further comprise sequences of instructions that cause the one or more processors to:

determine an address of the remote device;

determine a file name for the first segment of the boot image; and download the first segment of the boot image from the named file in the remote device.

25. An apparatus for performing remote boot operations, the apparatus comprising:

means for receiving a first segment of a boot image from a remote device;

means for verifying integrity of the first segment of the boot image;

means for determining authorization of the first segment of the boot image, wherein authorization is determined, at least in part, by a Remote-Boot Authorization Certificate that indicates an authorized source for the first segment of the boot image; and means for executing a sequence of instructions represented by the first segment of the boot image.

26. The apparatus of claim 25 further comprising means for receiving a signed manifest associated with the first segment of the boot image, the signed manifest having a digital certificate and a hash value corresponding to the first segment of the boot image.

27. The apparatus of claim 26 wherein the means for verifying integrity of the first segment of the boot image further comprises:

means for performing a hash function on the first segment of the boot image; and means for comparing a result of the hash function to the hash value from the signed manifest.

28. The apparatus of claim 25 wherein the means for receiving a first segment of a boot image from a remote device further comprises:

means for determining an address of the remote device;

means for determining a file name for the first segment of the boot image; and means for downloading the first segment of the boot image from the named file in the remote device.

29. A computer data signal embodied in a data communications medium shared among a plurality of network devices comprising sequences of instructions that, when executed, cause one or more electronic systems to:

receive a first segment of a boot image from a remote device;

verify integrity of the first segment of the boot image;

determine authorization of the first segment of the boot image, wherein authorization is determined, at least in part, by a Remote-Boot Authorization Certificate that indicates an authorized source for the first segment of the boot image; and execute a sequence of instructions represented by the first segment of the boot image.

30. The computer data signal of claim 29 further comprising sequences of instructions that when executed cause the one or more processors to receive a signed manifest associated with the first segment of the boot image, the signed manifest having a digital certificate and a hash value corresponding to the first segment of the boot image.

31. The computer data signal of claim 30 wherein the sequences of instructions that cause the one or more processors to verify integrity of the first segment of the boot image further comprise sequences of instructions that cause the one or more processors to:

perform a hash function on the first segment of the boot image; and compare a result of the hash function to the hash value from the signed manifest.

32. The computer data signal of claim 29 wherein the sequences of instructions that cause the one or more processors to receive a first segment of a boot image from a remote device further comprise sequences of instructions that cause the one or more processors to:

determine an address of the remote device;

determine a file name for the first segment of the boot image; and download the first segment of the boot image from the named file in the remote device.

33. The computer data signal of claim 29 wherein the Remote-Boot Authorization Certificate is configurable by the remote device, configuration comprising sequences of instructions that when executed by the one or more processors cause the one or more processors to:

receive a reconfiguration operation from the remote device;

check the integrity of the reconfiguration operation determine whether the reconfiguration operation is authorized to be performed; and modify a parameter set based, at least in part, on the reconfiguration operation.

34. The computer data signal of claim 29 wherein the sequences of instructions that cause the one or more processors to execute the sequence of instructions of the first segment of the boot image comprise sequences of instructions that cause the one or more processors to:

receive a second segment of the boot image from the remote device;

verify integrity of the second segment of the boot image;

determine authorization of second segment of the boot image, wherein authorization is determined, at least in part, by a Remote-Boot Authorization Certificate that indicates an authorized source for the second segment of the boot image; and execute a sequence of instructions represented by the second segment of the boot image.

\* \* \* \* \*